A. W. BURLINGAME.
NUT-LOCK.
No. 175,238. Patented March 28, 1876.
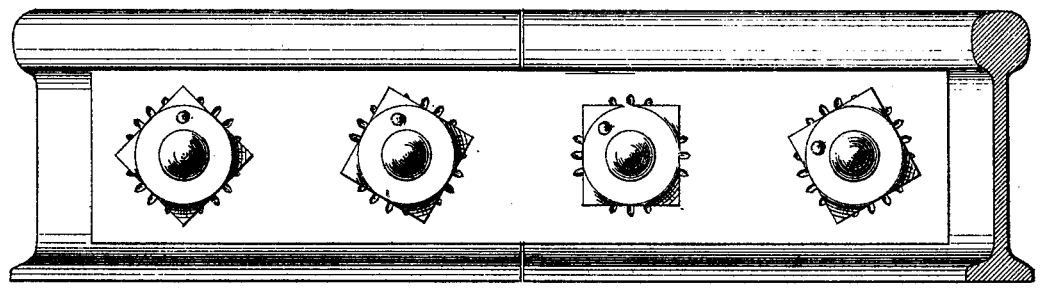
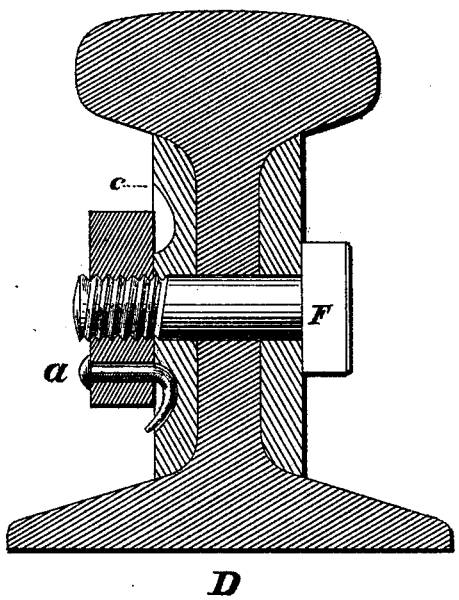
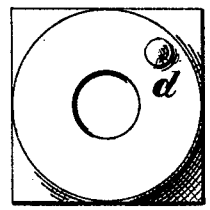
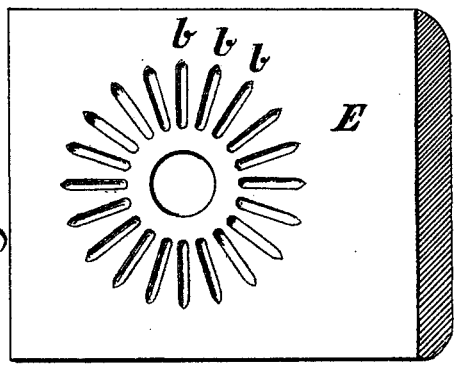

UNITED STATES PATENT OFFICE.

ALVAH W. BURLINGAME, OF BROOKLYN, NEW YORK.

IMPROVEMENT IN NUT-LOCKS.

Specification forming part of Letters Patent No. 175,238, dated March 28, 1876; application filed July 28, 1875.

*To all whom it may concern:*

Be it known that I, ALVAH W. BURLINGAME, of the city of Brooklyn, county of Kings, State of New York, have invented a new Nut-Lock, of which the following is a specification:

The object of my invention is to so form and connect the nut and washer of a bolt as to secure it against becoming loosened by continued shocks or jars, and especially to secure by its use the nuts used to fasten the ends of railway-rails, the fish-plate in this case acting as a washer.

A B in the drawing represent the application of this invention to the nuts and fish-plates of rails as ordinarily fastened. The parts of the drawing, C, D, E, F, and G, represent the model dissected, so as to show its essential parts in detail.

The invention consists in the perforation of the nut at one or more points, as at $d$, in the drawing G, for the reception of a soft-iron or metallic pin or nail, $a$. The plate representing the washer, or, in case of railway-bars, a portion of the fish-plate, has a series of radial grooves, $b\ b\ b$, &c., cut or stamped into the metal of the plate, of the form represented in the drawing.

The nut is screwed on in the usual manner, and the nail driven home. The nail, being of good wrought-iron, follows the groove $c$, (C D,) and effectually locks the nut.

When the invention is applied to bolts passing through wood, the washer may be stamped in a die that forms radial ridges on the reverse side of the washer, corresponding to the grooves $b\ b\ b$. These radial ridges, being forced into the wood in screwing home the nut, fix the washer upon the wood.

This form of nut-lock is simple and inexpensive, and can be readily applied to any railway or other fastenings. Should it become necessary to make any change in the position of the nut, the nail may be cut off by forcibly unscrewing the nut, and the latter refastened in the required position.

I claim—

The combination of the nut G, having the perforation $d$, the pin $a$, and the fish-plate or washer E, with the radial grooves $b\ b\ b$, so that when the pin $a$ is driven home through the nut it adjusts itself to one or other of the radial grooves, thereby forming a shoulder, and at the same time locking the nut and locking the pin into the nut, as and for the purpose described.

ALVAH W. BURLINGAME.

Witnesses:
   JAS. L. KEMPER,
   GEO. W. SKIDMORE.